Figure 1:
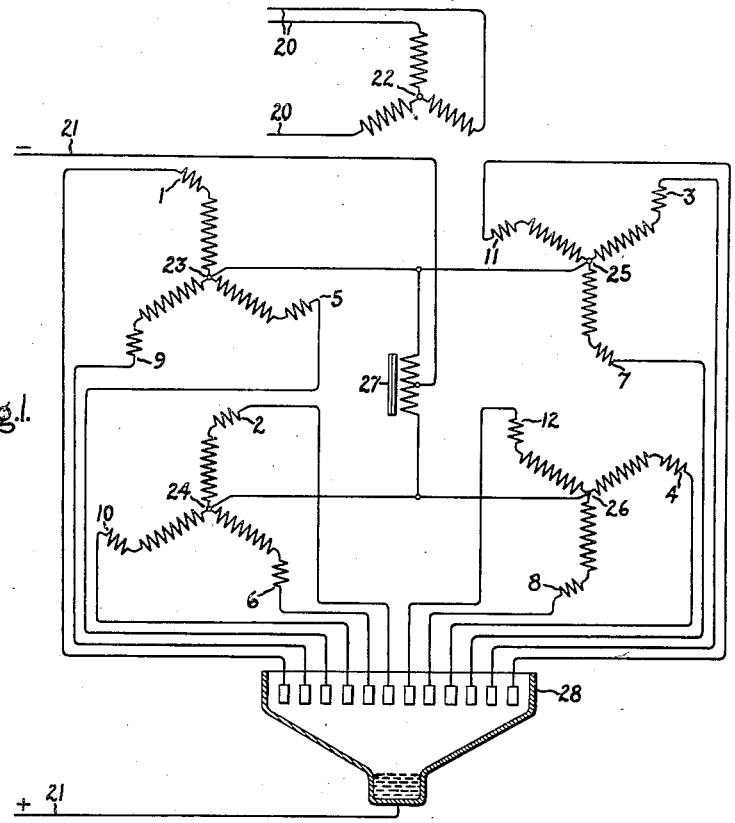

Sept. 25, 1934.    A. BOYAJIAN ET AL    1,974,980
ELECTRIC VALVE CONVERTING SYSTEM
Filed June 17, 1932

Inventors:
Aram Boyajian,
Earl V. De Blieux,
by Charles V. Mueller
Their Attorney.

Patented Sept. 25, 1934

1,974,980

UNITED STATES PATENT OFFICE 1,974,980

ELECTRIC VALVE CONVERTING SYSTEM

Aram Boyajian and Earl V. De Blieux, Pittsfield, Mass., assignors to General Electric Company, a corporation of New York Application June 17, 1932, Serial No. 617,822

7 Claims. (Cl. 175—363)

Our invention relates to electric valve converting systems, and more particularly to such systems employing a transforming apparatus having a winding system comprising a plurality of polyphase networks operating in parallel.

It is well known in the art that, when transmitting energy from an alternating current supply circuit to a direct current load circuit through an electric valve rectifier, such for example, as a mercury arc rectifier, the voltage regulation of the system and the utilization factor of the transformer are modified by increasing the equivalent number of phases of the secondary windings of the transformer in any of the several well known manners. If the primary windings of such transformer are connected in mesh or ring and the secondary windings are directly connected together at their electrical neutrals, each of the several anode paths in the rectifier is active for only 1/nth of a cycle where $n$ is the equivalent number of phases of the secondary winding system. In order to secure a better utilization of the rectifier apparatus, however, it is desirable to have several anodes active simultaneously. It has been found possible to secure this result by forming the secondary windings of the transformer into a plurality of independent polyphase networks and inter-connecting the electrical neutrals of these networks through midtapped reactors, known as interphase transformers. One particularly effective manner of securing an increase in the equivalent number of phases of the secondary winding system is to connect each of the several multiple secondary networks in star, each leg of the star being composed of a winding from two or more of the primary phases, an arrangement which is known as a zigzag connection. For example, the equivalent of twelve phase operation may be secured from a three phase supply circuit by connecting the secondary windings of a three phase transformer in quadruple zigzag, two of the secondary zigzags being interconnected with an interphase transformer, the other two being interconnected with a second interphase transformer, and the electrical neutrals of the two interphase transformers being interconnected by a third interphase transformer. Obviously, the use of three interphase transformers adds considerably to the cost and the complication of the system.

It is an object of our invention, therefore, to provide an improved electric valve converting system for transmitting energy between a polyphase alternating current circuit and a direct current circuit by means of which the equivalent number of phases of the apparatus may be increased, and which is not subject to the above mentioned disadvantages of the arrangements of the prior art.

It is another object of our invention to provide an improved electric valve converting system for transmitting energy between a polyphase alternating current circuit and a direct current circuit including transforming apparatus provided with multiple polyphase networks in which the number of simultaneously active anodes may be substantially increased.

It is a further object of our invention to provide an improved electric valve converting system for transmitting energy between a polyphase alternating current circuit and a direct current circuit, including transforming apparatus provided with multiple polyphase networks operating in parallel in which one or more of the interphase transformers customarily used to interconnect the multiple networks may be eliminated.

In accordance with one embodiment of our invention, a polyphase alternating current circuit is interconnected with a direct current circuit through a multiple anode electric valve apparatus and a transforming apparatus comprising primary and secondary winding systems, one of the winding systems comprising a single polyphase network connected to the polyphase circuit and the other comprising quadruple zigzag networks connected in parallel to the direct current circuit through the electric valve apparatus. The zigzagging of the multiple networks is such as to displace the terminal voltages of the several networks and thus produce the equivalent of an increased number of phases of the secondary winding system, as is well understood by those skilled in the art. Two of the multiple networks are directly connected as are the other two and the two pairs of networks are interconnected through a single interphase transformer provided with an electrical midtap which forms one side of the direct current circuit. In order to force an anode of each of the networks directly interconnected to be active simultaneously, the polyphase primary network is connected in star with an isolated neutral. With such a connection, currents must flow in at least two of the primary phases simultaneously, since there is no current path from the neutral. This forces current to flow simultaneously in a phase of each of the directly interconnected networks.

For a better understanding of our invention, together with other and further objects thereof, reference is had to the following description taken in connection with the accompanying drawing, and its scope will be pointed out in the appended claims.

Figure 2:
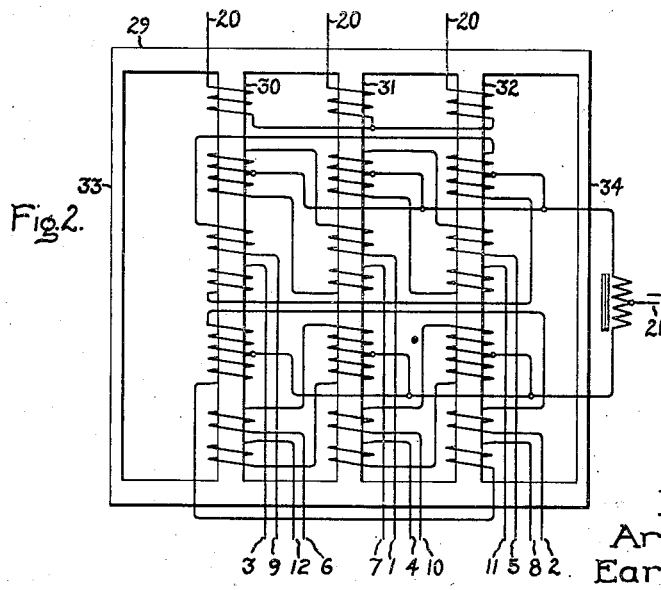

Fig. 1 of the accompanying drawing illustrates an arrangement embodying our invention for transmitting energy between a three phase alternating current circuit and a direct current circuit, while Fig. 2 is a schematic diagram showing the arrangement of the various winding elements of the transforming apparatus of Fig. 1.

Referring now to Fig. 1 of the drawing, there is illustrated a system embodying our invention for transmitting energy from a three-phase alternating current circuit 20 to a direct current circuit 21. This system includes transforming apparatus consisting of a three phase Y connected, isolated neutral, primary network 22 connected to the circuit 21 and four three phase zigzag secondary networks 23, 24, 25 and 26. Each phase of each of these secondary networks comprises a main winding, or long coil, inductively related to each of the primary phases, and an auxiliary winding, or short coil, inductively related to another of the primary phases. The cross connection of the phases and the proportioning of the long and short coils is such as to displace the terminal voltages of the networks 23, 24, 25 and 26, successively, by 30 electrical degrees and thus give the equivalent of twelve phase operation.

The networks 23 and 25 are directly interconnected, as are the networks 24 and 26, while the two pairs of networks thus formed are interconnected through an interphase transformer 27 provided with an electrical midpoint which forms the negative side of the direct current circuit 21. The several terminals 1-2 inclusive of the networks 23-26 inclusive, are connected to the anodes of a multiple anode rectifying apparatus, such for example as a mercury arc rectifier 28, the cathode of which forms the positive side of the direct current circuit 21. In Fig. 2 there is illustrated a preferred arrangement of the several transformer coils on a polyphase magnetic core member 29. The core 29 comprises three central yokes or legs, 30, 31 and 32, upon which the three phases of the transforming apparatus are wound, and a pair of outer legs 33 and 34 to provide a path for the zero phase sequence magnetic flux. However, the addition of the legs 33 and 34 diminishes the amount of iron necessary in the yokes 30, 31 and 32.

The general principles of operation of the above described rectifying system will be well understood by those skilled in the art. If the primary windings 22 of the transforming apparatus were connected in delta and the interphase transformer 27 were omitted, that is, if the networks 23-26, inclusive, were connected directly together, the apparatus would function as a straight twelve phase rectifier; for example, if the anode connected to terminal 1 is initially conducting and the phase rotation is such that the anode connected to the terminal 12 next reaches its maximum positive potential, as soon as the potential of the anode connected to terminal 12 exceeds that of the anode connected to terminal 1, the difference of potential between these two terminals is such as to tend to extinguish the current of the anode connected to terminal 1 and to build up the current in the anode connected to the terminal 12. This transfer of current is opposed only by the leakage reactance of the transformer windings, which is relatively small. Except for this period of transfer or commutating period, each of the anodes would tend to be conductive for only 30 electrical degrees. It will be noted that the successive terminals are associated with different networks. Hence, by interposing the interphase transformer 27 between the two pairs of networks, and giving this interphase transformer appreciable magnetizing reactance, the transfer of the current between the terminals associated with different pairs of networks may be substantially eliminated so that the current will tend to transfer only between those terminals associated with the same pair of networks; that is, the system operates as two independent six phase rectifiers. However, with the primary winding 22 connected in Y as illustrated, it will be noted that it is necessary for current to flow in at least two of the primary phases since there is no current path leading from the neutral. If current flows in two of the primary phases, obviously it must flow in at least two of the secondary phases, with the result that at least two anodes connected to terminals of a single pair of networks must be active simultaneously. It can easily be shown that the phase relations are such that, with a direct interconnection between the networks as illustrated, one anode of each of the networks 23 and 25 and one anode of each of the networks 24 and 26, are active simultaneously. In brief, by the above described connections, it has been possible to secure quadruple three-phase operation of the rectifying apparatus with the use of a single interphase transformer. In case the pairs of networks 23 and 25 and 24 and 26 are interconnected by interphase transformers, a third harmonic voltage, which for this system is a zero phase sequence voltage, appears across the interphase transformer but its reactance is sufficient to limit the third harmonic current to a small value. When anodes connected to both networks of a pair are forced to be active simultaneously, as described above, this third harmonic voltage appears between the terminals of the two networks and, unless there is provided a high reactance path for this voltage, a considerable third harmonic current will flow, which is undesirable from a number of standpoints. This reactance is provided, as illustrated in Fig. 2, by the outer legs 33 and 34, which provide a low reluctance path for the zero phase sequence flux.

Although we have illustrated our invention as applied to an arrangement for transferring energy from a three phase alternating current circuit by means of transforming apparatus having a Y connected primary winding and quadruple zigzag secondary windings, it will be obvious to those skilled in the art that it is equally applicable to any such system employing transforming apparatus having star connected primary windings and multiple secondary windings displaced in phase to increase the equivalent number of phases of the apparatus.

While we have described what we at present consider the preferred embodiment of our invention, it will be obvious to those skilled in the art that various changes and modifications may be made without departing from our invention, and we, therefore, aim in the appended claims to cover all such changes and modifications as fall within the true spirit and scope of our invention.

What we claim as new and desire to secure by Letters Patent of the United States is:

1. An electric valve converting system comprising a polyphase alternating current circuit, a direct current circuit, multiple anode electric valve apparatus, transforming apparatus including primary and secondary winding systems, one of said winding systems comprising a single polyphase network connected to said polyphase circuit and the other comprising a pair of polyphase networks connected in parallel to said direct current circuit through said electric valve apparatus, the terminal voltages of said pair of networks being displaced in phase to increase the equivalent number of phases of the winding system which they comprise, and connections having substantially no mutual reactance from said direct current circuit to the electrical neutrals of said pair of networks, said single polyphase network being so connected that any conducting path across said polyphase circuit includes a plurality of phase windings of said single polyphase networks, whereby current is forced to flow in both of said pair of networks simultaneously.

2. An electric valve converting system comprising a polyphase alternating current circuit, a direct current circuit, multiple anode electric valve apparatus, transforming apparatus including primary and secondary winding systems, one of said winding systems comprising a star connected isolated neutral polyphase network connected to said polyphase circuit and the other comprising pairs of polyphase networks connected in parallel to said direct current circuit through said electric valve apparatus, the terminal voltages of said pair of networks being displaced in phase to increase the equivalent number of phases of the winding system which they comprise, and connections having substantially no mutual reactance from said direct current circuit to the electrical neutrals of said pairs of networks, said connections comprising direct connections between the electrical neutrals of the networks of said pairs and a single interphase transformer device connected between said pairs of networks.

3. An electric valve converting system comprising an $n$-phase alternating current circuit where $n$ is an odd integer, a direct current circuit, multiple anode electric valve apparatus, transforming apparatus including primary and secondary winding systems, one of said systems comprising a star connected isolated neutral $n$-phase network connected to said $n$-phase circuit and the other comprising pairs of $n$-phase star connected networks connected in parallel to said direct current circuit through said electric valve apparatus, the corresponding phase windings of each of said pairs of networks being connected with opposite polarity, and connections having substantially no mutual reactance from said direct current circuit to the neutrals of said pairs of networks, said connections including a single interphase transformer interconnecting said pairs of neutrals of said networks.

4. A rectifying system comprising a three-phase alternating current supply circuit, a direct current load circuit, multiple anode rectifying apparatus, transforming apparatus comprising a Y connected primary winding energized from said supply circuit and a quadruple zig-zag secondary winding system, said zig-zag windings being connected in parallel to said load circuit through said rectifying apparatus, a direct connection between the electrical neutrals of two of said zig-zag windings, a direct connection between the electrical neutrals of the other two of said zig-zag windings, and an interphase transformer interconnecting the electrical neutrals of the two pairs of windings.

5. A rectifying system comprising a three-phase alternating current supply circuit, a direct current load circuit, multiple anode rectifying apparatus, transforming apparatus comprising a five-legged magnetic core member, a Y connected primary winding energized from said supply circuit and mounted on three legs of said core, and a quadruple zig-zag secondary winding system, said zig-zag windings being mounted on said three legs of said core member and being connected in parallel to said load circuit through said rectifying apparatus, a direct connection between the electrical neutrals of two of said zig-zag windings, a direct connection between the electrical neutrals of the other two of said zig-zag windings, and an interphase transformer interconnecting the electrical neutrals of the two pairs of windings.

6. An electric valve converting system comprising a polyphase alternating current circuit, a direct current circuit, multiple anode electric valve apparatus, transforming apparatus including primary and secondary winding systems, one of said winding systems comprising a star connected isolated neutral polyphase network connected to said polyphase circuit and the other comprising a pair of polyphase networks connected in parallel to said direct current circuit through said electric valve apparatus, the terminal voltages of said pair of networks being displaced in phase to increase the equivalent number of phases of the winding system which they comprise, means for providing a high reactance to the flow of zero phase sequence components, and a low impedance connection between the electrical neutrals of said pair of networks.

7. An electric valve converting system comprising a polyphase alternating current circuit, a direct current circuit, multiple anode electric valve apparatus, transforming apparatus comprising a magnetic core member and primary and secondary winding systems mounted thereon, one of said winding systems comprising a star connected isolated neutral polyphase network connected to said polyphase circuit and the other comprising a pair of polyphase networks connected in parallel to said direct current circuit through said electric valve apparatus, the terminal voltages of said pair of networks being displaced in phase to increase the equivalent number of phases of the winding system which they comprise, said magnetic core member being provided with a leg for each phase of said transforming apparatus and an additional leg to provide a low reluctance path for the zero phase sequence flux, and a low impedance connection between the electrical neutrals of said pair of networks.

ARAM BOYAJIAN.
EARL V. DE BLIEUX.